UNITED STATES PATENT OFFICE.

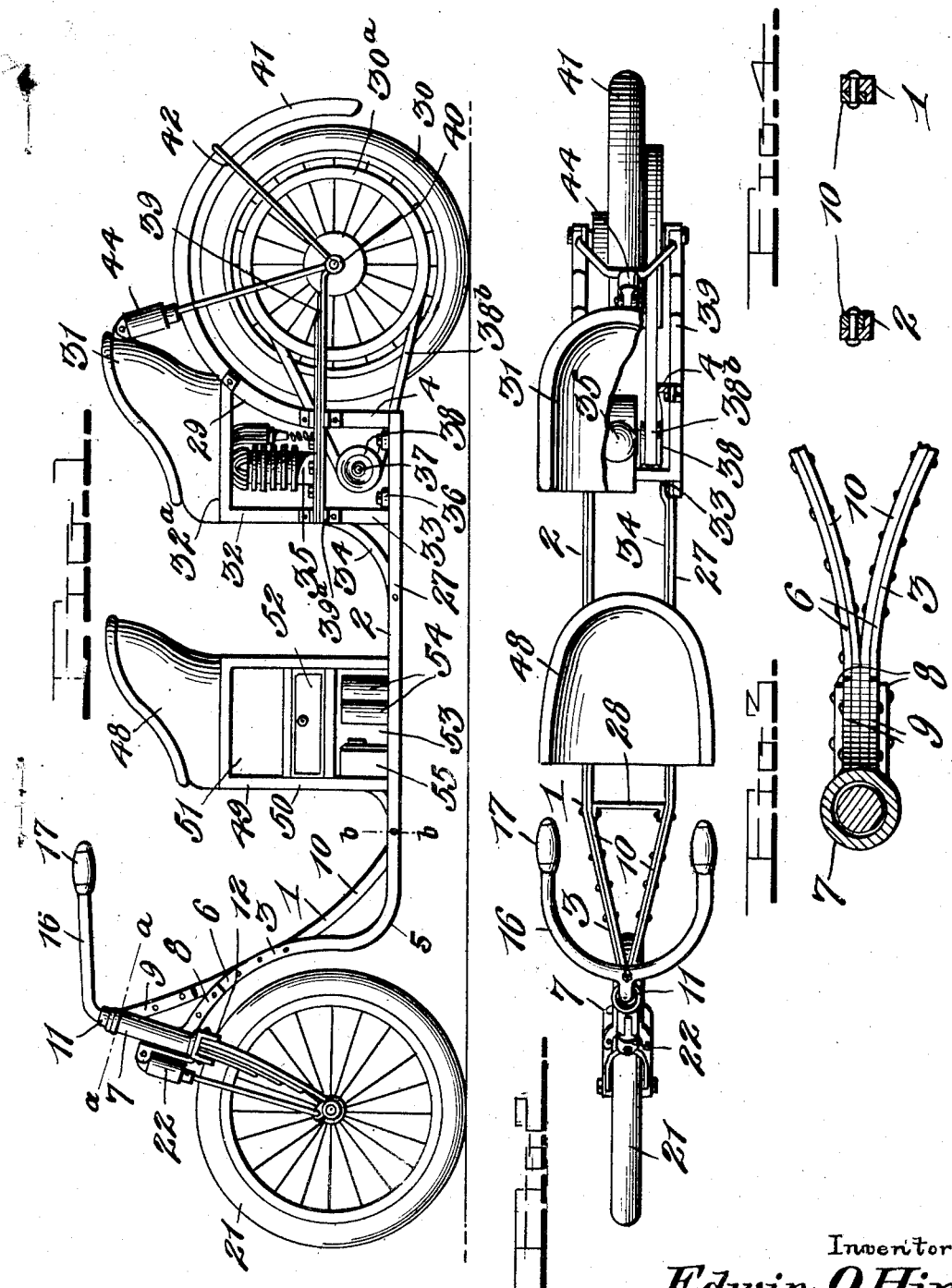

EDWIN O. HIMES, OF ALBION, INDIANA.

MOTOR-CYCLE.

1,039,943.  Specification of Letters Patent.  Patented Oct. 1, 1912.

Original application filed August 6, 1910, Serial No. 575,867. Divided and this application filed March 11, 1911. Serial No. 613,730.

*To all whom it may concern:*

Be it known that I, EDWIN O. HIMES, a citizen of the United States, residing at Albion, in the county of Noble and State of Indiana, have invented certain new and useful Improvements in Motor-Cycles, of which the following is a specification, reference being had to the accompanying drawings.

This invention relates to improvements in motor cycles and particularly with reference to the frames of motor cycles, the invention consisting in the construction, combination and arrangement of devices hereinafter described and claimed.

One object of my invention is to effect improvements in the construction of the frame of a motor cycle.

Another object is to effect improvements in the means for mounting the rear wheel.

Another object is to provide improved braces for the main frame and for the supporting frame of the seat.

This invention is a division of my pending application for Letters Patent of the United States for improvements in motor cycles, Serial No. 575,867, filed August 6th 1910.

In the accompanying drawings—Figure 1 is a side elevation of a motor cycle constructed in accordance with my invention. Fig. 2 is a plan of the same, a portion of the rear seat being removed, and the frame which supports the rear seat being shown partly in section. Fig. 3 is a detail plan, on a larger scale and partly a section on the plane indicated by the line *a—a* of Fig. 1. Fig. 4 is a detail transverse sectional view of the main frame on the plane indicated by the line *b—b* of Fig. 1.

In accordance with my invention, I provide a frame 1, which comprises a pair of cross sectional L-shaped steel side bars 2, each of which is provided with an upturned front portion 3, and an upturned rear portion 4. The upturned front portions 3 extend upwardly and forwardly and converge toward their front ends and constitute compound curves, the radius of the bends forming the lower curves 5, being less than that of the bends forming the upper curves 6.

A head 7 which in practice is a drop forging is provided on its rear side with a pair of lower arms 8, and a pair of upper arms 9. The lower arms bear on the front ends of the upturned portions 3 of the said bars 2, and are secured thereto as by means of suitable rivets or bolts. Braces 10 have their intermediate portions secured to the bends 6 of said upturned portions 3, their upper ends secured to and on the inner sides of the upper arms 9 of the head and their lower ends secured to and on the inner sides of the side bars 2 at points slightly in rear of the lower bends 5. Those portions of the braces 10 which are secured to the inner sides of the side bars 2, bear on the horizontal inwardly extending webs of said side bars as shown in detail in Fig. 3, and the extreme rear ends of the braces 10 are up-turned and secured to the inner sides of the front legs of the front seat supporting frame hereinafter described. The head is substantially tubular in form and receives the spindle of the front fork indicated at 12, and in practice ball bearings are provided in the ends of the head for the spindle of the fork. Since the fork for the front wheel 21 forms no part of my present invention described and claimed in the present application, it is deemed unnecessary to more specifically describe the fork herein. Handle bars 16 of usual construction have their connecting central portion secured on the projecting upper end of the spindle 11, and are provided at their ends with grips 17. Side bars of the main frame have their intermediate depressed lower portions 27 connected together at suitable points by cross bars 28, the ends of which are bent so as to bear against the inner sides of the side bars and are secured thereto by bolts. The bends 6 of the front portions of said side bars are concentric with the front wheel 21. The up-turned rear portions 4 of said side bars have bends 29 which are concentric with the rear wheel 30.

The rear seat 31 is supported partly by the up-turned rear portion 4 of the main frame side bars and partly by a frame 32, the front leg portions 33 of which have their lower ends secured to the side bars 2, and braced by means of braces 34. The rear seat frame 32 also has rearwardly extending bars 32ᵃ on which the rear seat is immediately secured and the rear ends of which are secured to the bends 29 of the upturned rear portions 4 of the side bars 2. The braces 34 are secured as by means of bolts or other suitable devices to the inner sides of the side bars 2, and hence they strengthen the construction both of the main frame side bars and of the rear seat supporting frame.

The motor 35 is mounted under the rear seat, its base 36 being bolted on the side bars 2 immediately in advance of the up-turned rear portions 4 and its crank shaft 37, being provided with a belt wheel 38.

A pair of rearwardly extending leaf springs 39 have their front portions secured to the outer sides of the legs of the rear supporting frame 32, and also to the upturned rear portions 4 of the side bars of the main frame, by means of angle irons 39ª, which lie in the angles between the said springs, the legs of the rear seat supporting frame and the upturned rear portions of the side bars of the main frame and are secured thereto. These springs are provided at their rear ends with bearing eyes 40 in which the ends of the spindles of the rear wheel 30 are mounted.

The rear wheel has a belt rim 30ª which is engaged by an endless belt or chain 38ᵇ, the said belt or chain being driven by the wheel 38.

A mud guard 41 has its front portion secured to the under side of the rear seat and is connected near its rear end to the spindle of the rear wheel by means of braces 42.

The front and rear wheels are provided with pneumatic shock absorbers which are indicated respectively at 22, 44 and are not herein specifically described or claimed because they are covered by the claims of my co-pending application for Letters Patent hereinbefore referred to.

The front seat 48 is supported by a frame 49, the lower end of the leg portions 50 of which are secured to the side bars of the main frame. Under the front seat is a gasolene supply tank or reservoir 51, a tool compartment 52, and a lower compartment 53 in which may be disposed the battery 54 and the coil 55.

Owing to the springs 39 which serve to mount the rear wheel 30, it will be understood that the rear of the machine rides very easily.

I do not desire to limit myself to the precise construction and arrangement of devices herein shown and described, as it is evident that modifications may be made therein without departing from the spirit of my invention, and within the scope of the appended claims.

I claim:—

1. In a motor cycle, a main frame having side bars provided with up-turned rear portions, a seat supporting frame lying in the angle between and secured to said side bars and the up-turned rear portions thereof, and horizontally disposed rear wheel supporting springs extending rearwardly from the main frame, and having their front ends secured to the seat supporting frame, and also to the up-turned rear end portions of the side bars of the main frame.

2. In a motor cycle, a main frame having side bars provided with compound curved forwardly and upwardly extending, and forwardly converging front portions, a head having lower arms and upper arms extending rearwardly therefrom, the lower arms of the head being attached to the front ends of the side bars, and braces bent reversely to the upturned portions of the side bars, having their front ends attached to the upper arms of the head, their intermediate portions attached to the up-turned portions of said side bars, and their lower rear ends attached to said side bars at points in rear of the up-turned front end portions thereof.

In testimony whereof I hereunto affix my signature in the presence of two witnesses.

EDWIN O. HIMES.

Witnesses:
 FRED B. MOORE,
 GEORGE L. FOOTE.